March 17, 1953 R. E. PECKHAM 2,631,633
NUT AND LOCK WASHER ASSEMBLY
Filed Dec. 18, 1947

INVENTOR.
Roy E. Peckham
BY
ATTORNEY

Patented Mar. 17, 1953

2,631,633

UNITED STATES PATENT OFFICE 2,631,633

NUT AND LOCK WASHER ASSEMBLY

Roy E. Peckham, Detroit, Mich., assignor to Robin Products Company, East Detroit, Mich.

Application December 18, 1947, Serial No. 792,502

1 Claim. (Cl. 151—37)

This invention relates to a nut and lock washer assembly and more particularly to a locking device adapted to be secured to a fastening member such as a nut.

An object of the invention is to provide a lock washer which is permanently fixed to the under surface of a nut and which is provided with locking teeth positioned radially inwardly from the outer periphery of the nut or the lock washer.

Another object of the invention is to provide an annular wall by counter-sinking the clamping face of the nut and to form the lock washer with deformable means for fixedly engaging the wall to retain the lock washer to the nut before the nut is applied in securing position.

A further object of the invention is to provide a lock washer having an annular outer peripheral body portion with radially and inwardly extending flanges bent axially out of the plane of the body portion, a portion of the flanges being deformable for fastening the lock washer to the nut and another portion of the flanges forming a locking means between the nut and a surface with which the nut is to be used.

A further object of the invention is to countersink an annular wall in the clamping face of a nut with a bottom wall axially spaced from the clamping face, fastening a lock washer to the annular wall and providing locking fingers projecting from opposite sides of the lock washer for holding engagement between the bottom wall and the surface with which the nut is associated.

Other objects and advantages of the invention will more fully appear from the following description taken in connection with the accompanying drawings in which.

When securing means, such as a nut and bolt, are used for securing parts together, it is desirable to provide a locking means between the nut and a surface to which the nut is applied to prevent turning of the nut relative to the part on the bolt. This has usually been done by the application of the well known lock washer between the surface of the part and the nut. However, the procedure in assembly requires the manipulation of a separate lock washer prior to assembly of the nut and often the operator is required to hold the bolt with one hand and apply the washer and nut with the other hand. I have found that by securing the lock washer to the nut in its proper location for assembly on the bolt with the nut, the operation of assembly is facilitated and a saving of time is obtained during final assembly.

Figure 1:
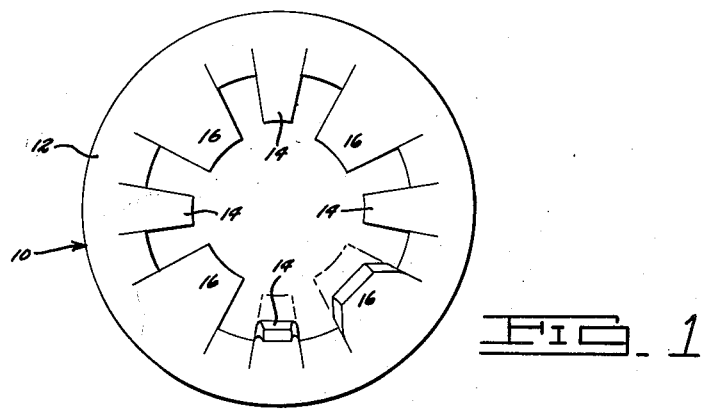
Fig. 1 is a top plan view of the lock washer.
Figure 2:
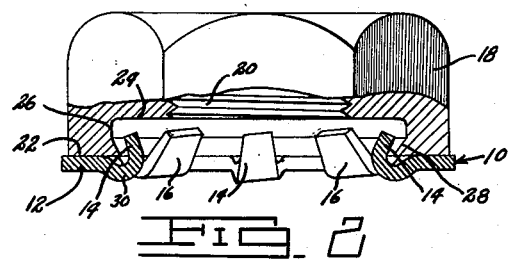
Fig. 2 is a sectional view of the washer shown in position prior to securing the lock washer to a fastener, shown as a nut.

In the form of the invention selected for illustrating the invention, I have shown a lock washer 10 having an outer annular body portion 12 and a plurality of inwardly and radially extending fingers 14 and 16 terminating short of the axis of the body portion 10 providing a central aperture through which a bolt or other securing means may project. This washer 10 is preferably stamped from sheet metal and as illustrated in Fig. 1, the fingers are originally formed flat and subsequently bent so as to project beyond opposite sides of the body portion of the washer, as shown in Fig. 2. The fingers 14 will be hereinafter referred to gripping fingers and the fingers 16 will be referred to as locking fingers. They are shown alternately spaced circumferentially around the inner opening through the lock washer.

Figure 3:
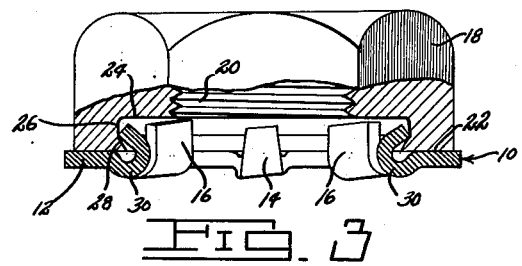
Fig. 3 is a view corresponding to Fig. 2 but showing the lock washer secured to the nut.
Figure 4:
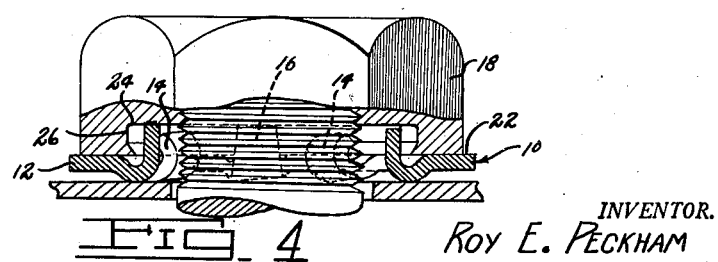
Fig. 4 is a cross sectional view showing the nut applied to securing means with the lock washer in holding position.

The fastening member is shown as a nut 18 having internal screw threads 20. The clamping surface 22 of the nut 18 is counterbored providing a bottom wall 24 and an annular wall 26 having an outwardly and inwardly extended tapered wall 28. This provides a countersunk opening adjacent the threaded portion of the nut for the reception of the gripping fingers 14 of the lock washer. The fingers 14 and 16 are adapted to fit within the counterbore, as illustrated in Fig. 2, and by the application of pressure the fingers are bent upwardly and inwardly with the fingers 14 coming into holding engagement with the tapered wall 28, as shown in Fig. 3. As will be noted, the bending operation also positions the fingers 16 into a vertical position with the free ends of the fingers 16 in close proximity to the bottom wall 24. The assembled nut and lock washer are then ready to be assembled on another fastening member, such as a bolt, for securing parts together as shown in Fig. 4.

The fingers are bent with the free ends and bottom thereof at a slight angle relative to the under surface of the nut so that turning of the nut in a direction opposite to turning for application the edges of the fingers are forced into the bottom wall of the nut and the surface to which the nut is applied, holding the nut in its applied location.

At the intersection of the fingers 14 and 16 with the body portion 12 of the washer, there is a reversely bent radius 30 which extends a portion of the fingers below the body of the washer and the major portion above the body of the washer. Since the fingers 14 and 16 are circumferentially spaced and the upper and lower edges of the fingers are at an angle to the lower surface of the nut, the opposite edges of the fingers are permitted to be embedded into the nut and surface of the part being secured upon reverse turning movement of the nut.

It will be understood that while I have shown the invention as applied to a nut, the novel lock washer may be secured to other fastening parts, such as snap fasteners and the like. Various changes including the size, shape and arrangement of parts may be made without departing from the spirit of my invention, and it is not my intention to limit its scope other than by the terms of the appended claim.

I claim:

A lock washer assembly including a rotary clamping member having a counter-bore in its clamping surface defining an undercut annular wall extending diagonally outwardly and inwardly and a bottom wall in a plane parallel to the clamping surface of the rotary clamping member but spaced therefrom, and a lock washer formed from flat spring stock including an annular body portion having inwardly extending fingers, a portion of said fingers being bent for holding engagement with the diagonally extending wall of the counter-bore, and another portion of said fingers being bent in a plane normal to the plane of said washer and projecting beyond the opposite sides of said washer, the outer free ends of said last named fingers being in engagement with the bottom wall of the counter-bore, the opposite end edges of said fingers being in a plane at an angle to the plane of the bottom wall and the plane of the clamping surface.

ROY E. PECKHAM.

REFERENCES CITED

The following references are of record in the file of this patent:

UNITED STATES PATENTS

| Number | Name | Date |
|---|---|---|
| 1,885,761 | Peirce | Nov. 1, 1932 |
| 1,924,695 | Olson | Aug. 29, 1933 |
| 2,128,429 | Olson | Aug. 30, 1938 |
| 2,225,654 | Olson | Dec. 24, 1940 |

FOREIGN PATENTS

| Number | Country | Date |
|---|---|---|
| 1,315 | Great Britain | of 1901 |